(12) United States Patent
Asakawa et al.

(10) Patent No.: US 8,040,549 B2
(45) Date of Patent: Oct. 18, 2011

(54) IMAGE PROCESSING APPARATUS

(75) Inventors: Tetsuo Asakawa, Tokyo (JP); Miki Kouchi, Kanagawa (JP); Akihiro Kakoi, Kanagawa (JP); Rie Nakamura, Kanagawa (JP); Yoshinori Furuichi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1143 days.

(21) Appl. No.: 11/759,017

(22) Filed: Jun. 6, 2007

(65) Prior Publication Data

US 2008/0008400 A1    Jan. 10, 2008

(30) Foreign Application Priority Data

Jul. 4, 2006   (JP) ................. 2006-184498

(51) Int. Cl.
*H04N 1/00* (2006.01)
*G06K 15/00* (2006.01)

(52) U.S. Cl. .......... 358/1.16; 358/1.2; 358/505

(58) Field of Classification Search ......... 358/1.16, 358/1.17, 404, 1.1, 1.12, 1.13, 500, 501, 358/505, 527, 528, 400, 401, 443, 444, 448, 358/449

See application file for complete search history.

(56) References Cited

U.S. PATENT DOCUMENTS

| 5,223,948 A * | 6/1993 | Sakurai et al. ............ 358/404 |
| 5,877,864 A * | 3/1999 | Sumida et al. ............ 358/1.16 |
| 7,859,704 B2 * | 12/2010 | Nakamura et al. ............ 358/1.16 |
| 2005/0146760 A1 * | 7/2005 | Kim et al. ............ 358/538 |
| 2007/0188834 A1 | 8/2007 | Nakamura et al. | |

FOREIGN PATENT DOCUMENTS

| JP | 1-155762 | 6/1989 |
| JP | 2-72763 | 3/1990 |
| JP | 5-37747 | 2/1993 |
| JP | 9-247307 | 9/1997 |
| JP | 9-284539 | 10/1997 |
| JP | 10-312137 | 11/1998 |
| JP | 2000-47534 | 2/2000 |
| JP | 2002-55576 | 2/2002 |
| JP | 2003-233596 | 8/2003 |
| JP | 3501470 | 12/2003 |
| JP | 2006-157784 | 6/2006 |

OTHER PUBLICATIONS

Japanese Office Action issued Apr. 12, 2011, in Patent Application No. 2006-184498.

* cited by examiner

*Primary Examiner* — Chan S Park
*Assistant Examiner* — Lawrence Wills
(74) *Attorney, Agent, or Firm* — Oblon, Spivak, McClelland, Maier & Neustadt, L.L.P.

(57) ABSTRACT

An image processing apparatus, includes an image reading part configured to read an image of a document; and an image storage part configured to store image data read by the image reading part; wherein the image reading part includes a part configured to read a range of a part of the image of the document; the image processing apparatus further includes: a first calculating part configured to calculate image data of a one surface of the document based on a size of the image data of the range read by the image reading part; and a second calculating part configured to calculate the number of pages of image data of the document which can be stored by the image storage part based on the result of calculation by the first calculating part.

5 Claims, 13 Drawing Sheets

IMAGE PROCESSING APPARATUS

BACKGROUND OF THE INVENTION

1. Field of the Invention

The present invention generally relates to image processing apparatuses, and more specifically, to a image processing apparatus where, for example an image forming apparatus such as a digital copier, a printer, facsimile, or scanner can be installed in or connected to the image processing apparatus.

2. Description of the Related Art

In digital copiers, for example, in order to realize sort function or the like for processing image data of plural documents, it is necessary to provide an image storage part such as an HDD (Hard Disk Drive) having a storage capacity for storing the image data of plural documents.

However, in a digital copier including only an image storage part having a small storage capacity, the amount of storage of image data of the document is limited, and the storage capacity may be exceeded during reading the document image. In other words, while the image data are being read, a case may happen where a request of a user cannot be accomplished such as a case where image data of all documents cannot be stored.

Because of this, for example, Japanese Laid-Open Patent Application Publication No. 5-37747 describes an image storage device wherein an expected data size of the entire document is calculated based on the amount of image data actually read from a part or a specific page of a document or the expected data amount of a single document based on past information and the number of the documents. If there is no sufficient free storage capacity in the storage part (image storage part), a warning is issued.

Japanese Laid-Open Patent Application Publication No. 5-37747 also describes that compressibility of the image data is made high for storage by converting multi-value data to binary data in a case where the free storage of the storage part is expected to be small.

However, in the image storage device described in Japanese Laid-Open Patent Application Publication No. 5-37747, only whether all the image data of the document can be stored is determined. In other words, in this image storage device, whether a part of the image data can be stored is not shown to the user. In addition, a specific value of the part of the image data is not shown to the user.

This is because the device described in Japanese Laid-Open Patent Application Publication No. 5-37747 is merely the image storage device and only whether all the image data of the document can be stored is important in the request for this device.

In the image forming apparatus having a copier function such as a digital copier, output is performed with input (storage) and therefore the user wishes to know not whether all the image data of the document can be stored but whether a divided part can be stored.

However, such demand cannot be met by the image storage device described in Japanese Laid-Open Patent Application Publication No. 5-37747. In addition, in order to read the image data of one page of the document, it is necessary to read all the image data of one surface of the document. Therefore, it takes time and effort of the user for determining whether storing the image data can be achieved.

SUMMARY OF THE INVENTION

Accordingly, embodiments of the present invention may provide a novel and useful image processing apparatus solving one or more of the problems discussed above.

More specifically, the embodiments of the present invention may provide an image processing apparatus such as an image forming apparatus or a scanner which can be installed in or connected to the image forming apparatus, whereby the number of pages of image data of a document that can be stored in an image storage part is estimated (calculated) for a short period of time and the number of the pages can be reported to a user before output (printing output) of the image data is started.

One aspect of the present invention may be to provide an image processing apparatus, including:

an image reading part configured to read an image of a document; and an image storage part configured to store image data read by the image reading part;

wherein the image reading part includes a part configured to read a range of a part of the image of the document;

the image processing apparatus further includes:

a first calculating part configured to calculate image data of a one surface of the document based on a size of the image data of the range read by the image reading part; and a second calculating part configured to calculate the number of pages of image data of the document which can be stored by the image storage part based on the result of calculation by the first calculating part.

According to the image processing apparatuses of embodiments of the present invention, the image processing apparatus can read only an area of a part of a document image so that the number of pages of document image data that can be stored in the image storage part can be estimated (calculated).

Therefore, it is possible to report the number of the pages to a user before output of the image data is started.

Other objects, features, and advantages of the present invention will be come more apparent from the following detailed description when read in conjunction with the accompanying drawings.

DETAILED DESCRIPTION OF THE PREFERRED EMBODIMENTS

A description is given below, with reference to the FIG. 1 through FIG. 13 of embodiments of the present invention.

First, a control system of a digital multifunction product (hereinafter "MFP") as an image processing apparatus of an embodiment of the present invention is discussed with reference to FIG. 1.

Figure 1:
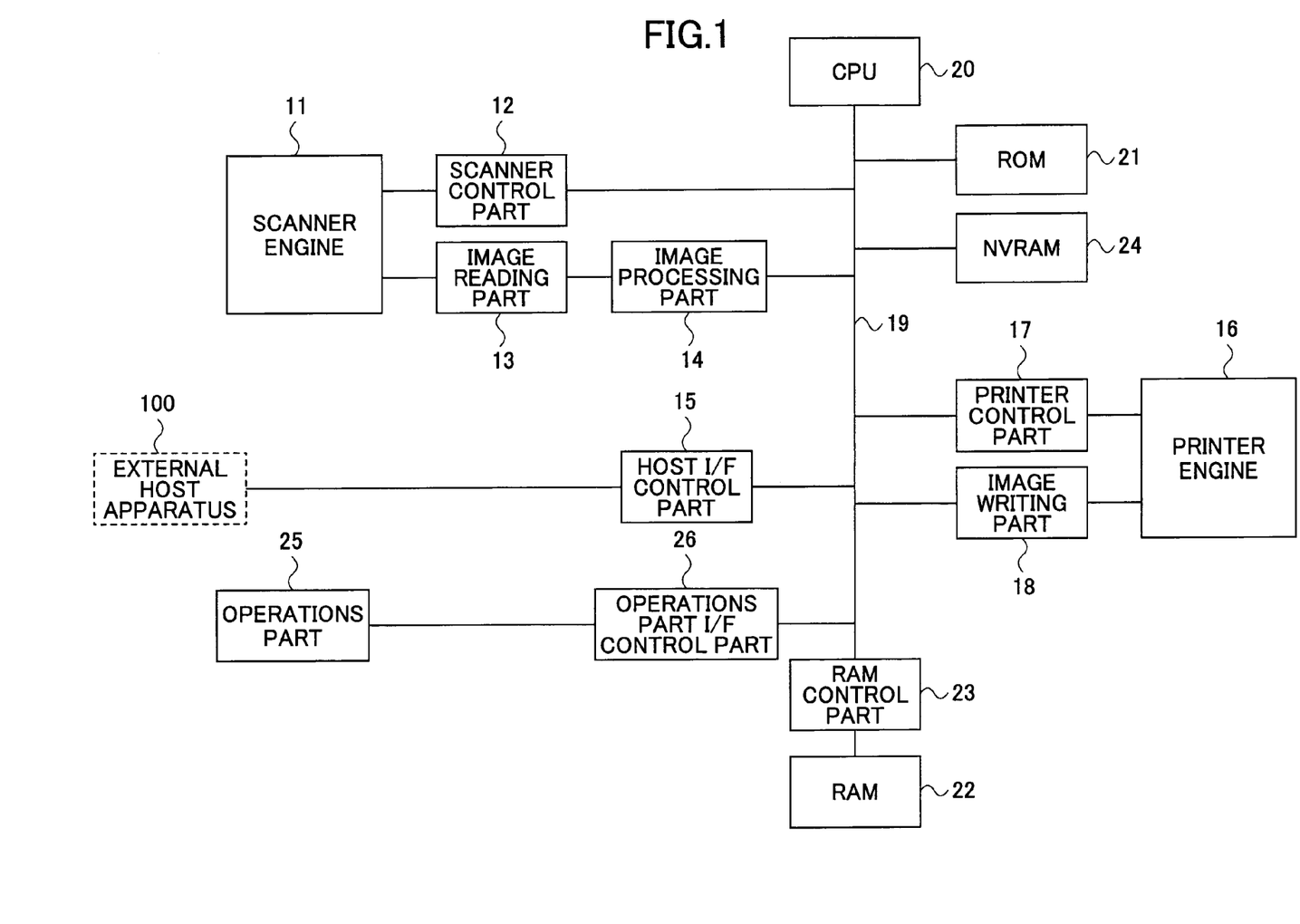
FIG. 1 is a block diagram showing a structural example of a control system of an MFP (multifunction product) of an embodiment of the present invention.

FIG. 1 is a block diagram showing a structural example of the control system of the MFP of the embodiment of the present invention.

The MFP includes a copier function, a printer function, and a scanner function as basic functions.

The MFP includes a scanner engine 11 which is an image reading part configured to read an image of a document as an image input part for realizing the copier function and the scanner function. The MFP also includes a scanner control part 12 and an image reading part 13. The scanner control part 12 controls the scanner engine 11. The image reading part 13 takes in image data from the scanner engine 11.

An image processing part 14 performs a digital signal process proper for the image data taken into the image reading part 13.

The MFP also includes a host interface control part 15 as an image input part for realizing the printer function. The host interface control part 15 receives printing data from an external host apparatus 100, namely image data or code data such as character code for forming the image data. As an interface (hereinafter "I/F"), a local connection such as IEEE 1284 or a USB or a network connection such as the Ethernet® by wire or radio is used.

The MFP includes a printer engine 16 as an image output part (printing output part) for realizing the copier function, the scanner function, and the printer function. The printer engine 16 prints (forms an image) on a paper or other printing medium by using an image forming method such as a laser type, an LED type or an inkjet type. The MFP also includes a printer control part 17 and an image writing part 18. The printer control part 17 controls the printer engine 16. The image writing part 13 inputs the image data.

The MFP also includes a CPU 20 instructing, controlling or the like each of the components via a CPU bus 19. A program implemented by the CPU 20 is stored in a ROM 21. Plural CPUs 30 may be installed so that processing properties of the MFP can be improved.

By the CPU 20 executing the program in the ROM 21, functions such as a first calculating part, a second calculating part, a range setting part, and a data size setting part can be achieved.

The RAM 22 is used for storing data, for a while, of a process of each of the components including the CPU 20, via the RAM control part 23. Here, the RAM 22 corresponds to an image storage part. A memory other than the RAM 22 may be separately provided.

An NVRAM 24 is a non-volatile memory and used for storing information peculiar to the apparatus such as a counter value of the number of copies.

An operations part 25 is a man-machine I/F part with an apparatus operator, such as a button for operating the apparatus or an indicator (a display such as LED or LCD, a speaker, or the like) for displaying the status of the apparatus. Input and output of information with the operations part 25 are implemented by an operations part I/F control part 26.

Next, details of the operations part 25 shown in FIG. 1 are discussed.

Figure 2:
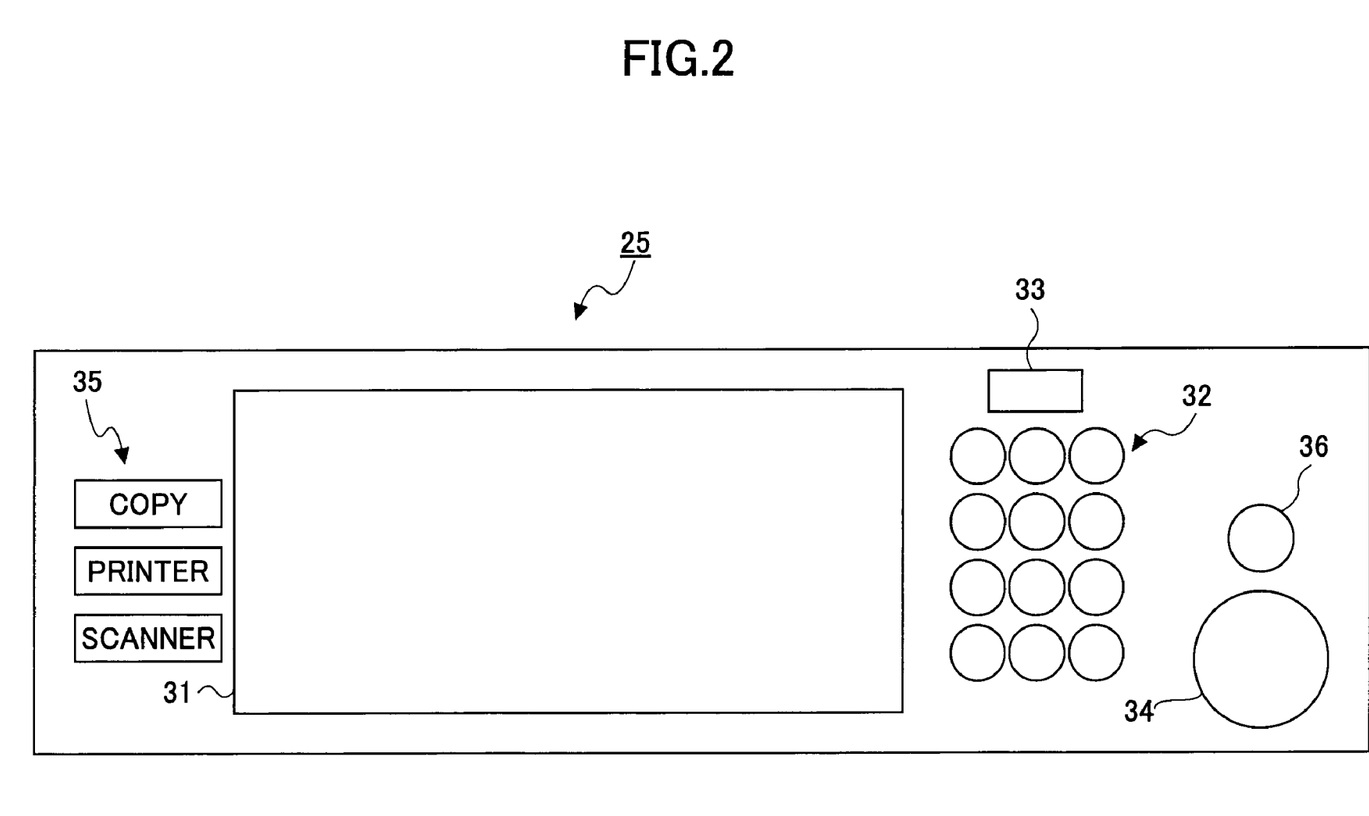
FIG. 2 is a schematic view showing an example of layout of an operations part 25 shown in FIG. 1.

FIG. 2 is a schematic view showing an example of the layout of the operations part 25 shown in FIG. 1.

The operations part 25 includes a display part 31 and operations keys (buttons) such as a ten key 32, a reset key 33, a start key 34, an application switching key 35, and a clear stop key 36.

The display part 31 displays characters or bit map.

The ten key 32 is used for operations such as input of various kinds of setting values or the number of copies printed.

The rest key 33 is used when a copy mode is reset.

The start key 34 is used for operations for instructing start of reading the document or copying.

The application switching key 35 is used for switching each of the copy function, the printer function, and the scanner function.

The clear stop key 36 is used when copying operations are stopped or the number of copies is to be reset.

In the operations part 25 in this example, the operations keys are formed by hard keys. However, the present invention is not limited to this example. For example, instead of the operations keys of this example, operations key displayed on a liquid crystal touch panel provided in the display part 31 may be used.

Next, reading the document (document image) by the scanner engine 11 is discussed with reference to FIG. 3 and FIG. 4.

Figure 3:
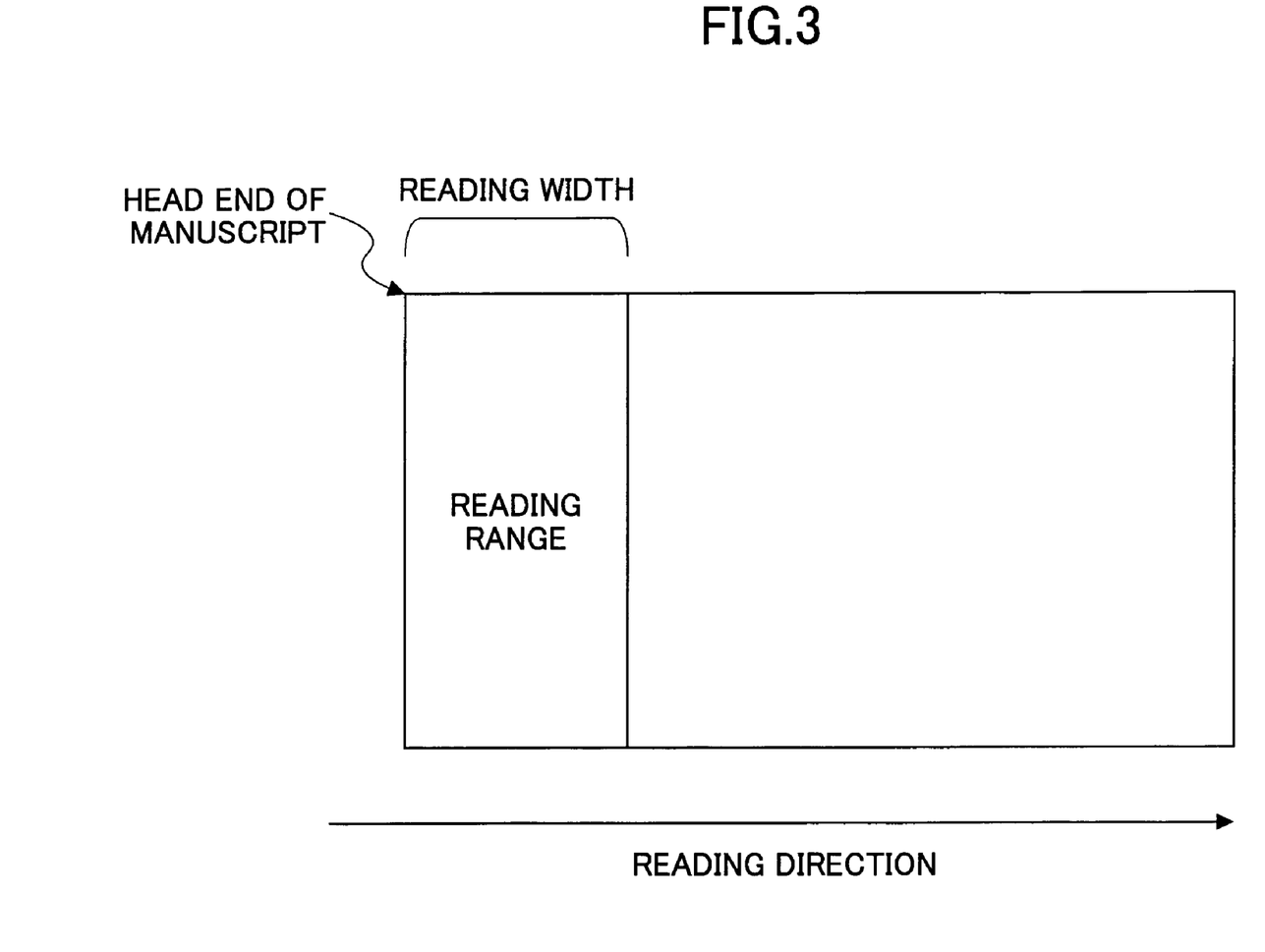
FIG. 3 is a view for explaining a document and a reading range and direction in a case where the reading width from a head end of the document is designated.

FIG. 3 is a view for explaining a document and a reading range and direction in a case where the reading width from a head end of the document is designated.

As shown in FIG. 3, the reading width in the reading direction from the head end of the document is the reading range of the document.

Figure 4:
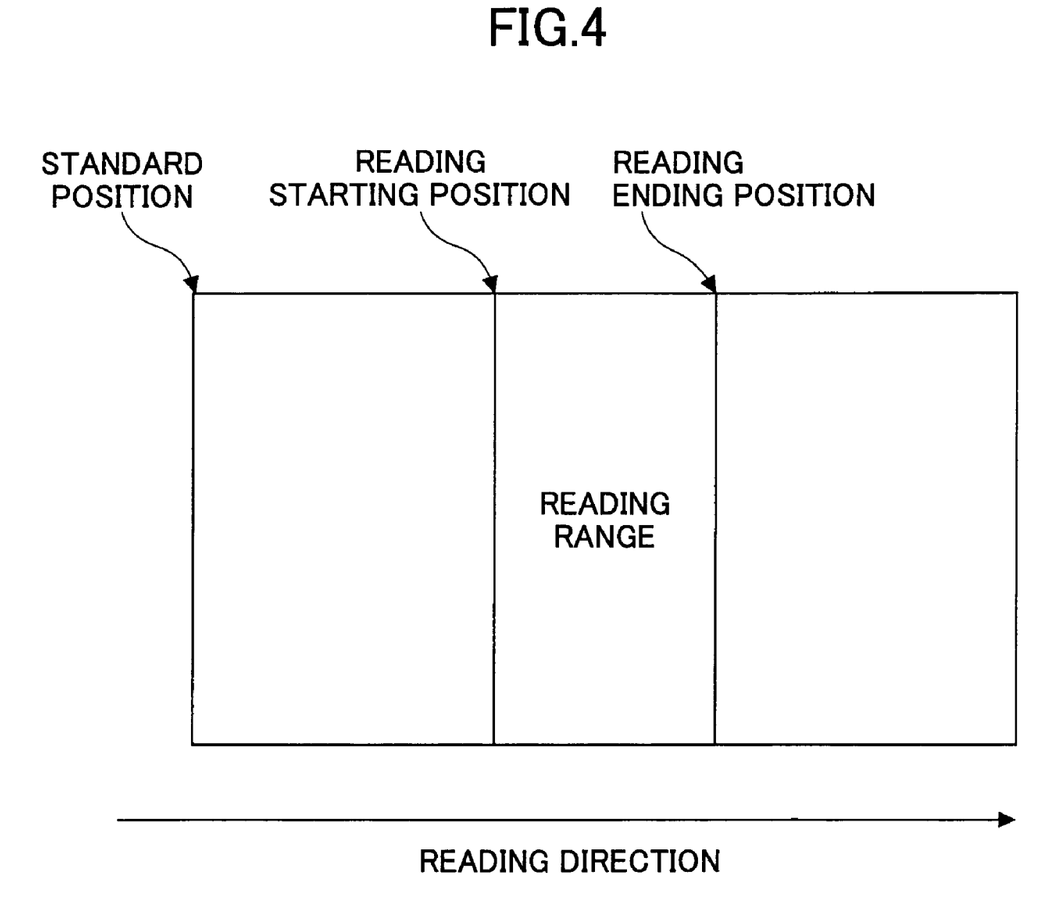
FIG. 4 is a view for explaining a document and a reading range and direction in a case where an area of the document is designated.

FIG. 4 is a view for explaining a document and a reading range and direction in a case where an area of the document is designated.

As shown in FIG. 4, the reading range of the documents is defined by a reading staring position and a reading ending position from the head end of the document in the reading direction.

A method using the following equation can be used for calculating the image data size (image data amount) of one surface of the document from the size of the image data of the read range.

$$\text{A method for calculating the image data size (image data amount) of one surface of the document} = \text{the area of the document} \div (\text{a sum of}) \text{ reading area} \times (\text{a sum of}) \text{ read data size} \qquad [\text{Equation}]$$

Examples of controls by the CPU 20 shown in FIG. 1 are discussed with reference to FIG. 5 through FIG. 13, by using sort copy (copy using a sort function) where the number of pages of the document are related as a limitation. An output function (output condition) other than the sort function may be used. In addition, while an ADF (automatic document feed apparatus) not shown is mounted on the scanner engine 11, the ADF is not always necessary.

First Example

A first example is discussed with reference to FIG. 5 through FIG. 8.

Figure 5:
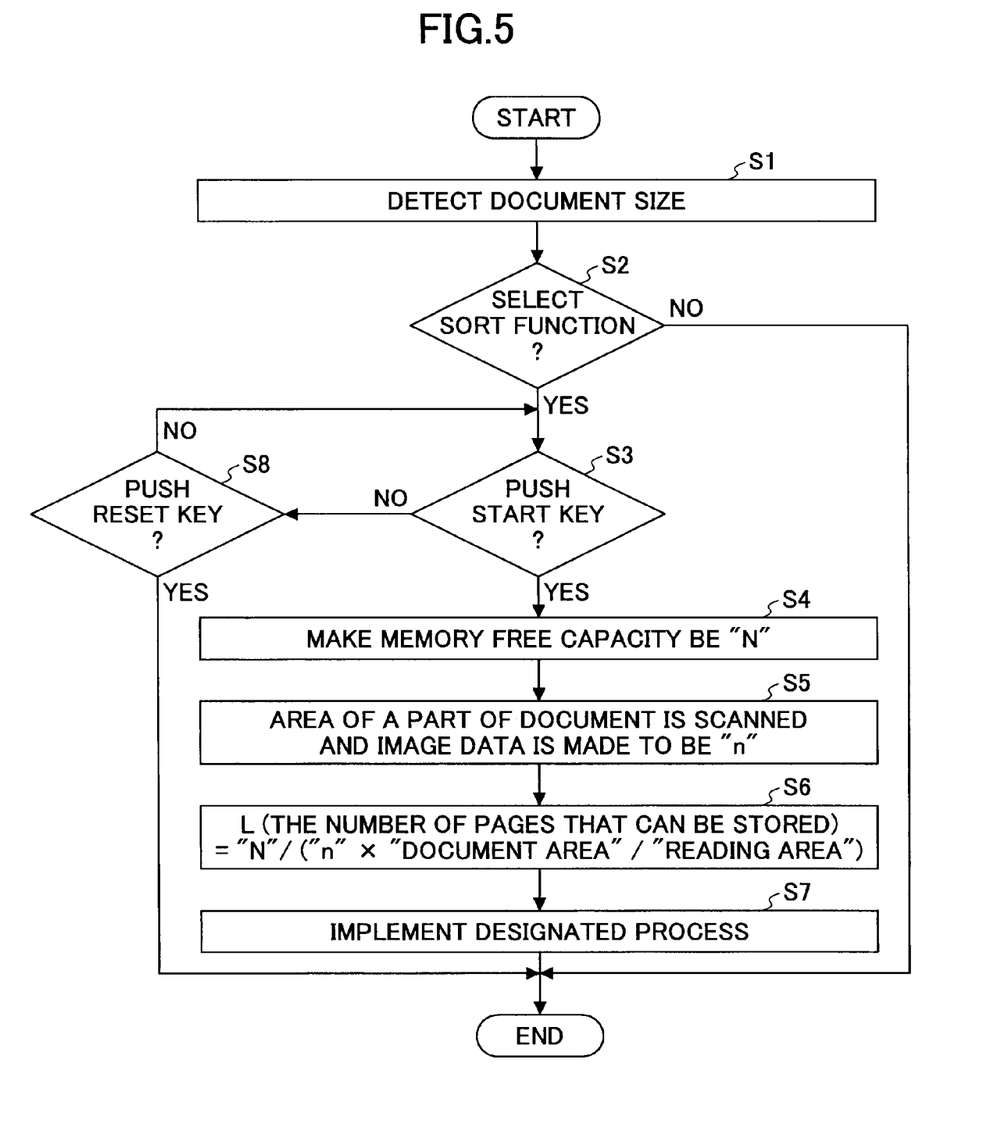
FIG. 5 is a flowchart of a first example of control of an embodiment of the present invention by a CPU 20 shown in FIG. 1.

FIG. 5 is a flowchart of a first example of control of an embodiment of the present invention by the CPU 20 shown in FIG. 1.

Plural documents are set on a document stand of the ADF, and the CPU 20 detects the size of the document in step S1.

In other words, a first sheet among plural sheets of documents provided on the document stand is automatically fed onto a contact glass of the scanner engine 11 by the ADF. At the time of feeding, the size of the document is detected by a sensor (not shown).

The size of the document on the contact glass may be detected by a sensor (not shown). This can also be applied to second and third examples discussed below.

Next, whether the sort function is selected as an output condition is determined in step S2.

In a case where the sort function is selected, whether the start key 34 is pushed is determined in step S3. If the start key 34 is pushed, the process goes to step S4 so that the free capacity of the memory (RAM) 22 at that time is obtained and the memory free capacity is made to be "N".

Here, the sort function (sort copy) is a function for completing the printing sheets in page order, by reading an image of the manuscripts of plural pages (plural sheets) in order, by storing image data of all documents in the memory in order, by reading the stored image data in the page order, and by repeating a process for printing the image data as visible images on the corresponding sheets in order at designated times.

The memory corresponds to the RAM 22 in this embodiment. However, another memory such as an HDD (hard disk drive) may be used.

Figure 6:
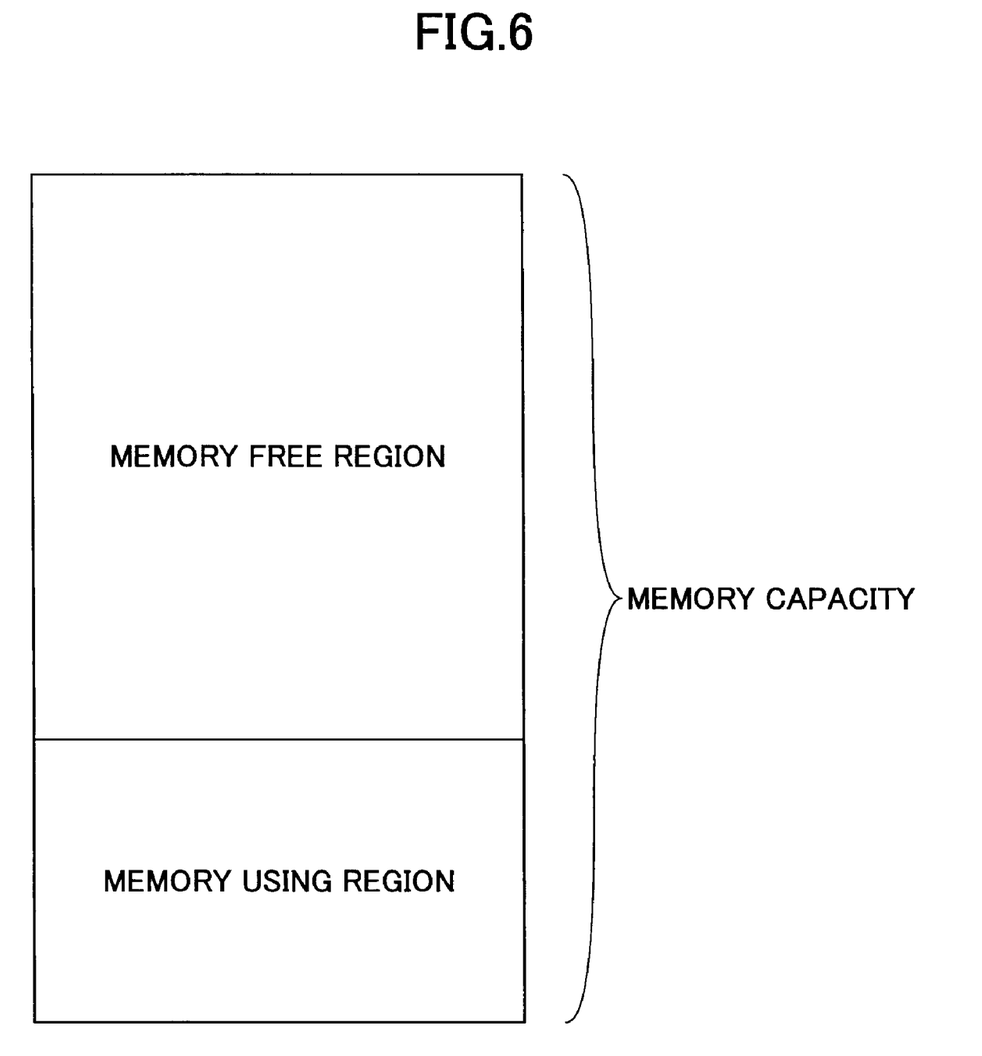
FIG. 6 is a view for explaining memory free capacity.

As shown in FIG. 6, the memory free capacity (memory free region) is a capacity formed by reducing the memory amount already used (memory using region) from an existing memory capacity. Here, FIG. 6 is a view for explaining a memory free capacity.

After that, the process goes to step S5 so that the reading width (see FIG. 3) or the reading range (see FIG. 4) from the head end of the document that is a part of the document is scanned by the scanner engine 11, the image of the range of the part is read, the capacity of the read image data (data size) is measured (calculated), and the capacity is made to be "n".

Next, the process goes to step S6 and the number of pages that can be stored is set equal to "L". "N" is divided by ("n"×"document area"/"reading area") and decimal points are omitted, so that "L" is calculated.

After this, designated processes are implemented in step S7.

In a case where the sort function as the copy condition is not selected, calculation of the number of pages L that can be stored is not performed so that the process goes to end as it is.

In a case where the start key 34 is not pushed, the process goes to step S8 to determine whether the reset key 33 is pushed.

If the reset key 33 is not pushed, the process goes to step S3. If the reset key 33 is pushed, the process goes to end as it is. In other words, in a case where the reset key 33 is pushed before the start key 34 is pushed, the process goes to end as it is and therefore calculation of the number of pages L that can be stored is not performed.

Here, the reading width from the head end of the document (see FIG. 3) or the reading starting position and the reading ending position of the reading range (see FIG. 4) can be input in advance by the operation of operations key including the ten key 32 on the operations part 25 shown in FIG. 2, can be stored in the NVRAM 24 shown in FIG. 1 by the CPU 20, and can be referred to if necessary.

Figure 7:
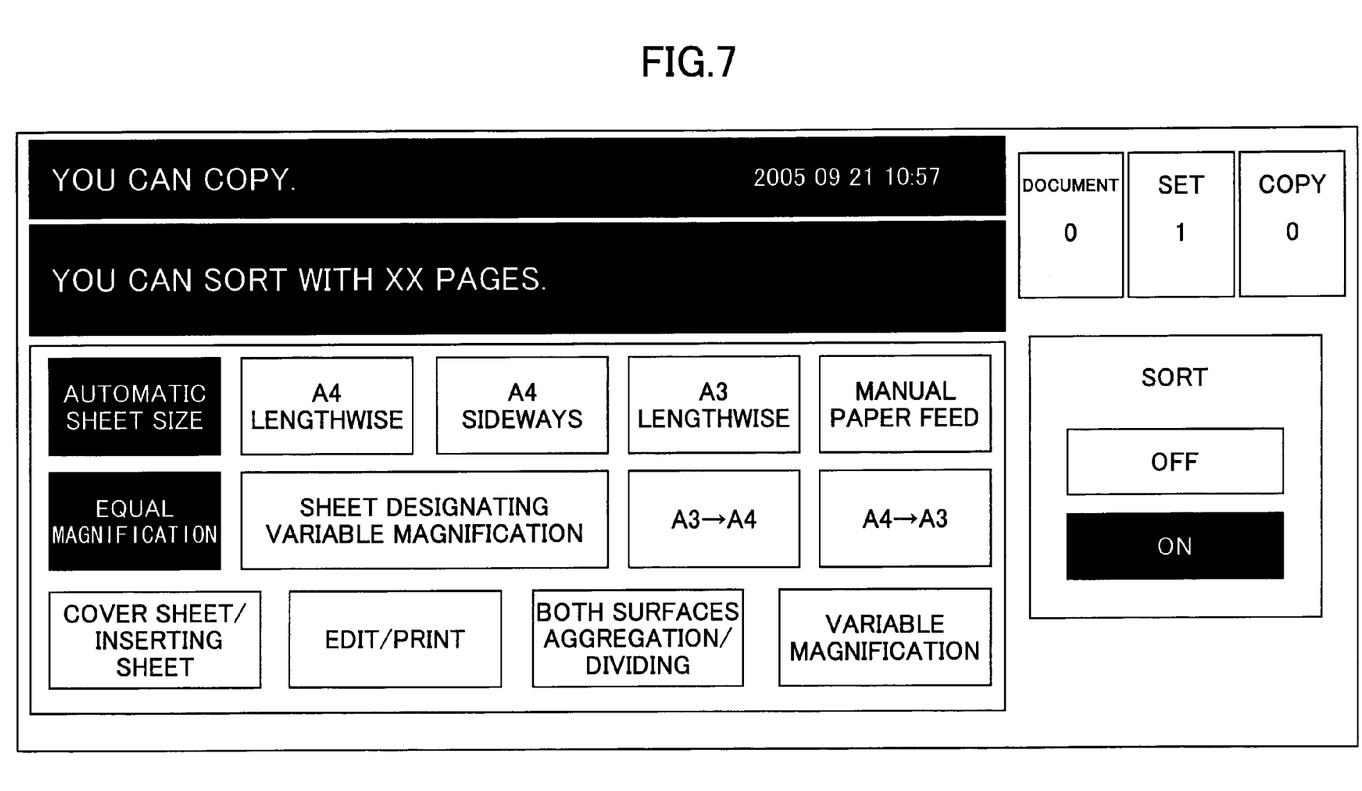
FIG. 7 is a view showing an example of a screen indicating the number of pages where document image data can be stored, the screen being displayed on the operations part 25 shown in FIG. 1.
Figure 8:
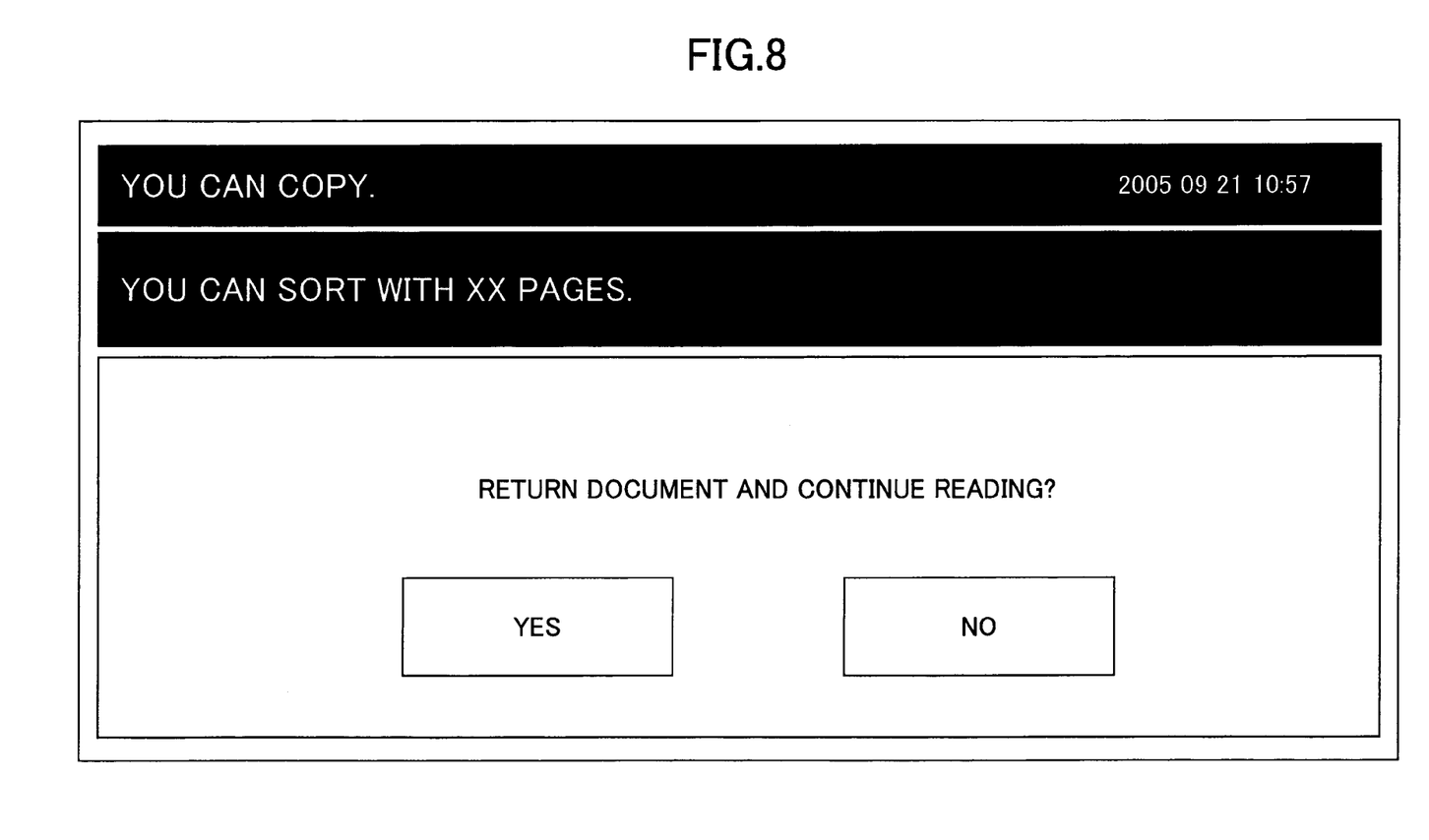
FIG. 8 is a view showing an example of a screen indicating the number of pages where document image data can be stored and a step for performing sort copying after this.

FIG. 7 is a view showing an example of a screen indicating the number of pages where document image data can be stored, the screen being displayed on the operations part 25 shown in FIG. 1. FIG. 8 is a view showing an example of a screen indicating the number of pages where document image data can be stored and a step for performing sort copying after this.

The designated process in step S7 is a display of the number of pages L that can be stored on the operations part 25 (the display part 31 of the operations part 25 actually) (see FIG. 7) and a display of steps for executing the sort copy after this (see FIG. 8).

For example, in a case where steps of the display shown in FIG. 8 are taken, namely a case where the first sheet document read is returned to the document stand and reading continues, after the user returns the document to the document stand, the "YES" key is pushed.

The CPU 20 automatically makes the ADF feed the plural documents on the document stand one by one from the first sheet onto the contact glass of the scanner engine 11, reads the image of the document on the contact glass every time of feeding by the scanner engine 11, and stores the image data of the read document in a memory.

After storing the image data of the document of all pages (within the number of pages L that can be stored) in the memory is finished, the image data of the documents are successively forwarded to the image writing part 18 in order at designated times. The image data are printed on corresponding sheets as visible images by the printer engine 16 so that the printed sheets are discharged to a paper discharge tray in order.

After image reading is finished, the document on the contact glass is discharged to the document discharge tray not shown.

Second Example

A second example is discussed with reference to FIG. 4 and FIG. 7 through FIG. 9.

Figure 9:
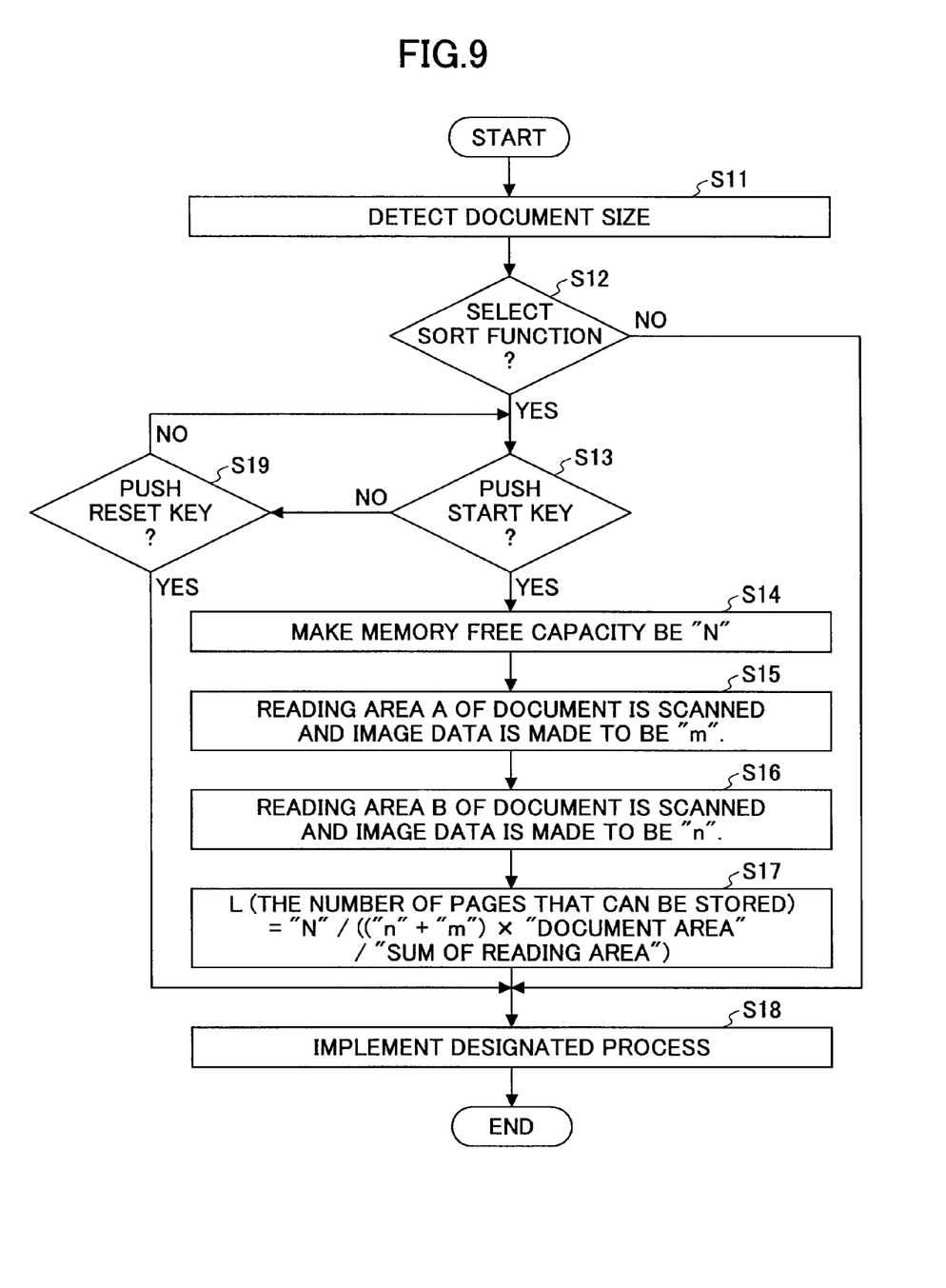
FIG. 9 is a flowchart of a second example of control of an embodiment of the present invention by the CPU 20 shown in FIG. 1.

FIG. 9 is a flowchart of a second example of a control of an embodiment of the present invention by the CPU 20 shown in FIG. 1.

In this example as well as the first example, plural documents are set on the document stand of the ADF, and the CPU 20 detects the size of the document in step S11.

Next, whether the sort function as an output condition is selected is determined in step S12.

In a case where the sort function is selected, whether the start key 34 is pushed is determined in step S13. If the start key 34 is pushed, the process goes to step S14 so that the free capacity of the memory (RAM) 22 at that time is obtained and the memory free capacity is made to be "N".

After that, the process goes to step S15 so that the reading range A (see FIG. 4) that is a range of a part of the document is scanned by the scanner engine 11, the image of the range of the part is read, the capacity of the read image data (data size) is measured (calculated), and the capacity is made to be "m".

Next, the process goes to step S16 so that the reading range B (see FIG. 4) that is a different range of a part of the document is scanned by the scanner engine 11, the image of the range of the part is read, the capacity of the read image data (data size) is measured (calculated), and the capacity is made to be "n".

Next, the process goes to step S17 and the number of pages that can be stored is set equal to "L". "N" is divided by (("n"+"m")×"document area"/"(sum of) reading area") and decimal points are omitted, so that "L" is calculated.

After this, designated processes are implemented in step S18.

In a case where the sort function as the output condition is not selected, calculation of the number of pages L that can be stored is not performed so that the process goes to the end as it is.

In a case where the start key 34 is not pushed, the process goes to step S19 so that whether the reset key 33 is pushed is determined.

If the reset key 33 is not pushed, the process goes back to step S13. If the reset key 33 is pushed, the process goes to the end as it is. In other words, in a case where the reset key 33 is pushed before the start key 34 is pushed, the process goes to the end as it is and therefore calculation of the number of pages L that can be stored is not be performed.

Here, the reading starting positions and the reading ending positions of the reading range A and B (see FIG. 4) can be input in advance by operation of the operations key including the ten key 32 on the operations part 25 shown in FIG. 2, can be stored in the NVRAM 24 shown in FIG. 1 by the CPU 20, and can be referred to if necessary.

The designated process in step S18 is a display of the number of pages L that can be stored on the operations part 25 (the display part 31 of the operations part 25 actually) (see FIG. 7) and a display of steps for executing the sort copy after this (see FIG. 8).

Operations by the user and processed by the CPU 20 after this are the same as those of the first example.

Third Example

A third example is discussed with reference to FIG. 4, FIG. 7, FIG. 8, and FIG. 10.

Figure 10:
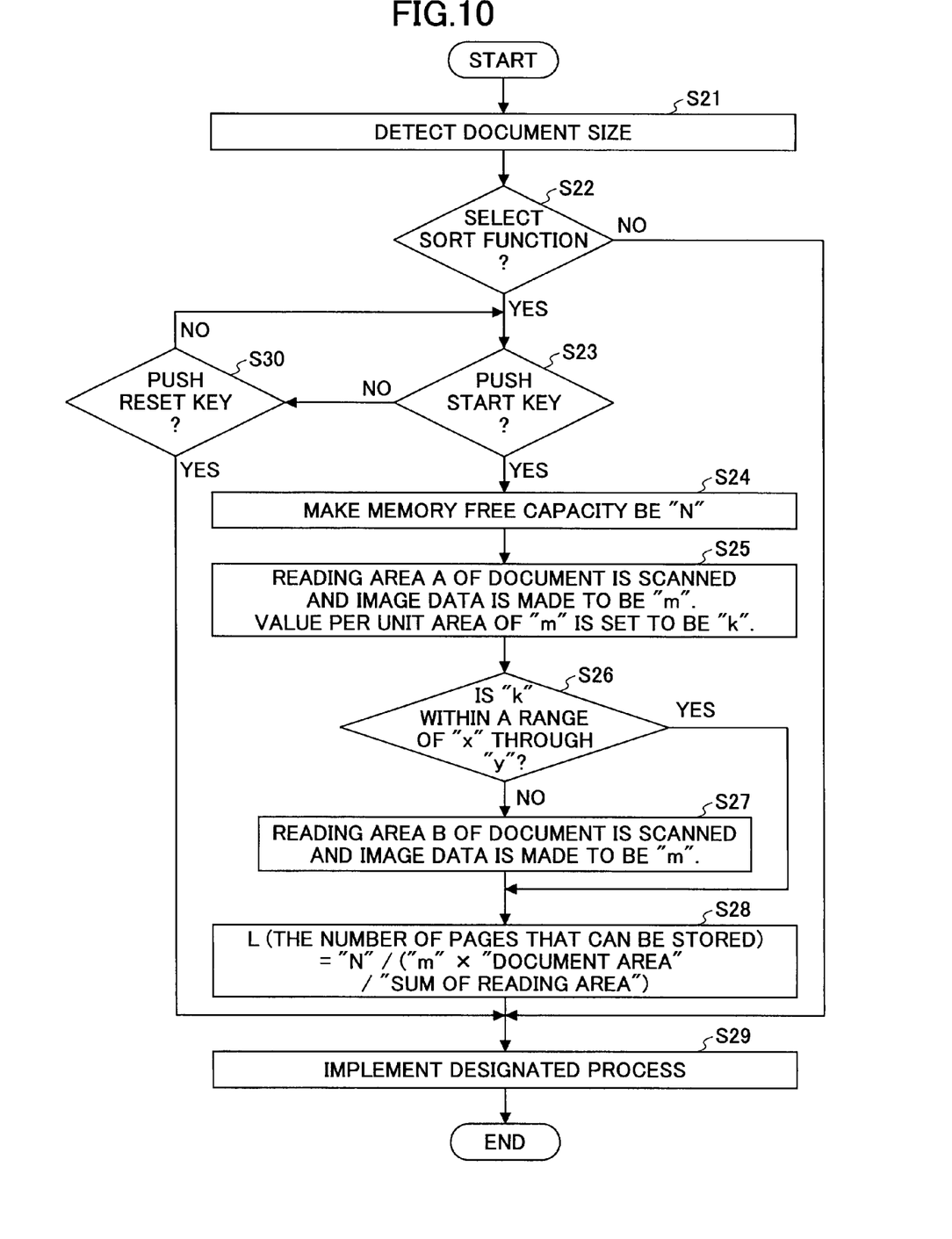
FIG. 10 is a flowchart of a third example of control of an embodiment of the present invention by the CPU 20 shown in FIG. 1.

FIG. 10 is a flowchart of a third example of a control of an embodiment of the present invention by the CPU 20 shown in FIG. 1.

In this example as well as the first example, plural documents are set on the document stand of the ADF, and the CPU 20 detects the size of the documents in step S21.

Next, whether the sort function as an output condition is selected is determined in step S22.

In a case where the sort function is selected, whether the start key 34 is pushed is determined in step S23. If the start key 34 is pushed, the process goes to step S24 so that the free capacity of the memory (RAM) 22 at that time is obtained and the memory free capacity is made to be "N".

After that, the process goes to step S25 so that the reading range A (see FIG. 4) that is a range of a part of the document is scanned by the scanner engine 11, the image of the range of the part is read, the capacity of the read image data (data size) is measured (calculated), and the capacity is made to be "m". In addition, a value of "m" per unit area is made to be "k".

Next, in step S26, whether "k" is within a range from a standard value "x (lower limit of the number of the image data per unit area)" to a stand and value "y (upper limit of the number of the image data per unit area)" is determined.

If "k" is within the range from the standard values "x" through "y", the process immediately goes to step S28.

If "k" is not within the range from the standard values "x" through "y", the process goes to step S27 so that the reading range B (see FIG. 4) that is a different range of a part of the document is scanned by the scanner engine 11, the image of the range of the part is read, the capacity of the read image data (data size) is measured (calculated), and the capacity is made to be "n".

Next, the process goes to step S28 and the number of pages that can be stored is set to "L". "N" is divided by ("m"× "document area"/"(sum of) reading area") and decimal points are omitted, so that "L" is calculated.

After this, designated processes are implemented in step S29.

In a case where the sort function as the output condition is not selected, calculation of the number L of pages that can be stored is not performed so that the process goes to the end as it is.

In a case where the start key 34 is not pushed, the process goes to step S30 so that whether the reset key 33 is pushed is determined.

If the reset key 33 is not pushed, the process goes back to step S23. If the reset key 33 is pushed, the process goes to the end as it is. In other words, in a case where the reset key 33 is pushed before the start key 34 is pushed, the process goes to the end as it is and therefore calculation of the number of pages L that can be stored is not be performed.

Here, the reading starting positions and the reading ending positions of the reading range A and B (see FIG. 4) and the standard values (designated data size) x and y can be input in advance by operation of the operations keys including the ten key 32 on the operations part 25 shown in FIG. 2, can be stored in the NVRAM 24 shown in FIG. 1 by the CPU 20, and can be referred to if necessary.

The designated process in step S29 is a display of the number of pages L that can be stored on the operations part 25 (the display part 31 of the operations part 25 actually) (see FIG. 7) and a display of steps for executing the sort copy after this (see FIG. 8).

Operations by the user and processed by the CPU 20 after this are the same as those of the first example.

Figure 11:
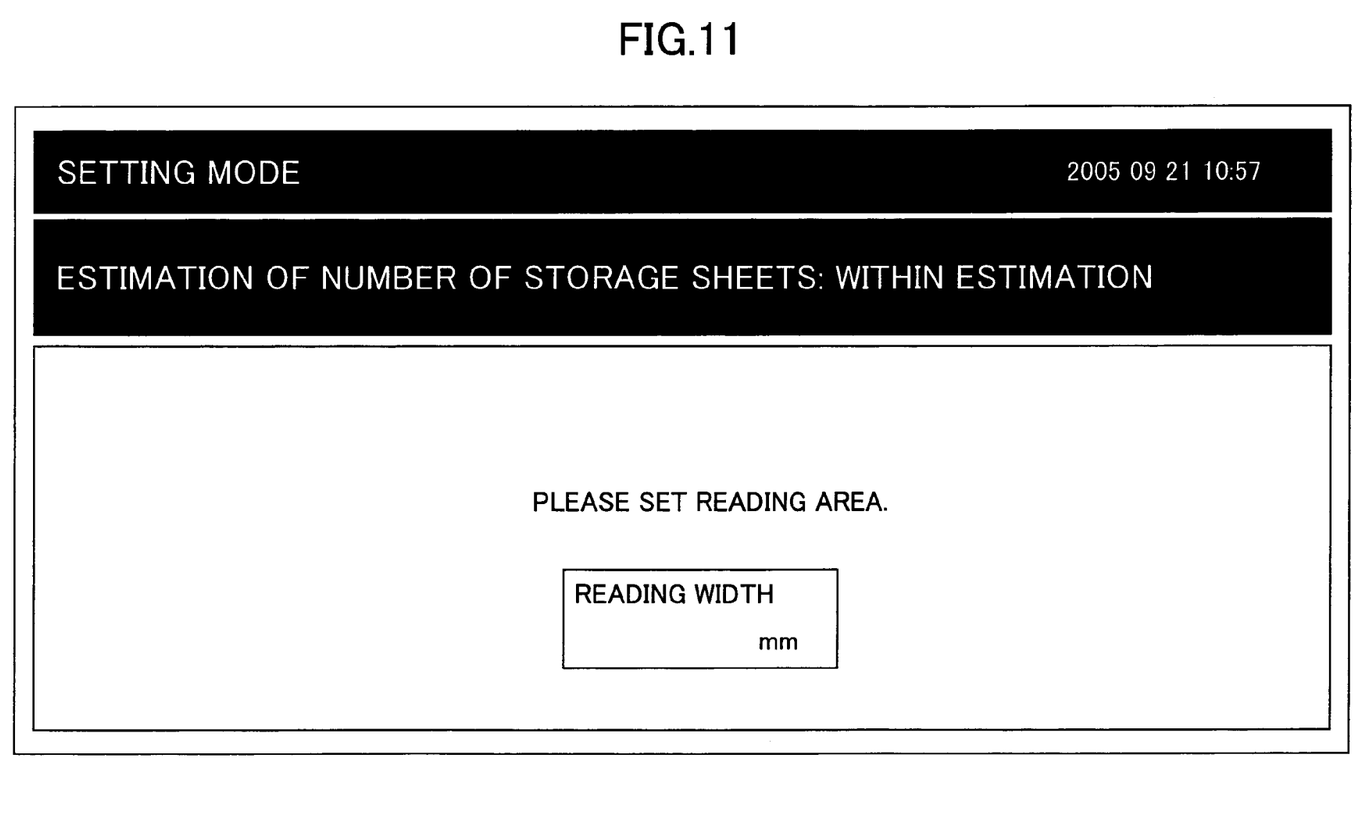
FIG. 11 is a view showing an example of a screen for setting reading width from a head end of the document, the screen being displayed on the operations part 25 shown in FIG. 1.
Figure 12:
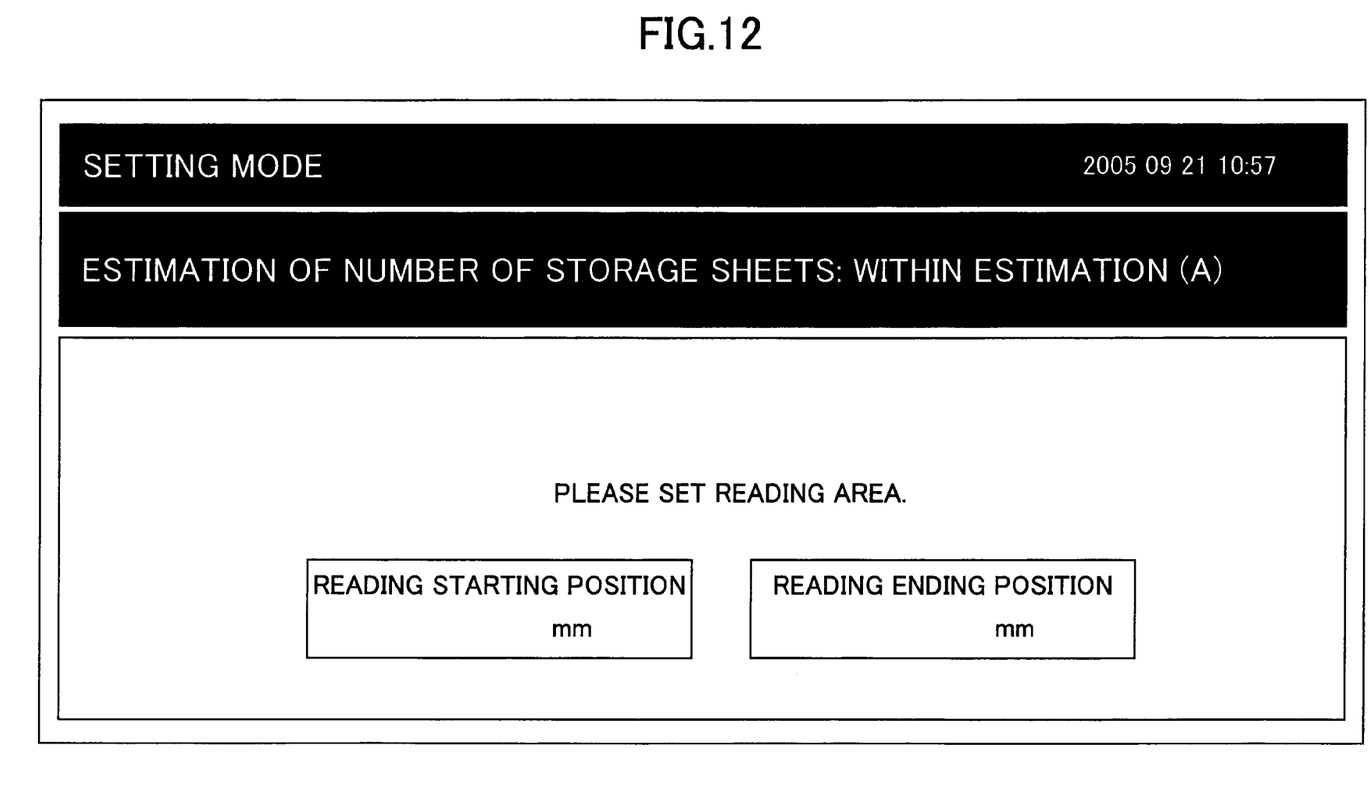
FIG. 12 is a view showing an example of a screen for setting a reading starting position and a reading ending position of each of the reading areas.
Figure 13:
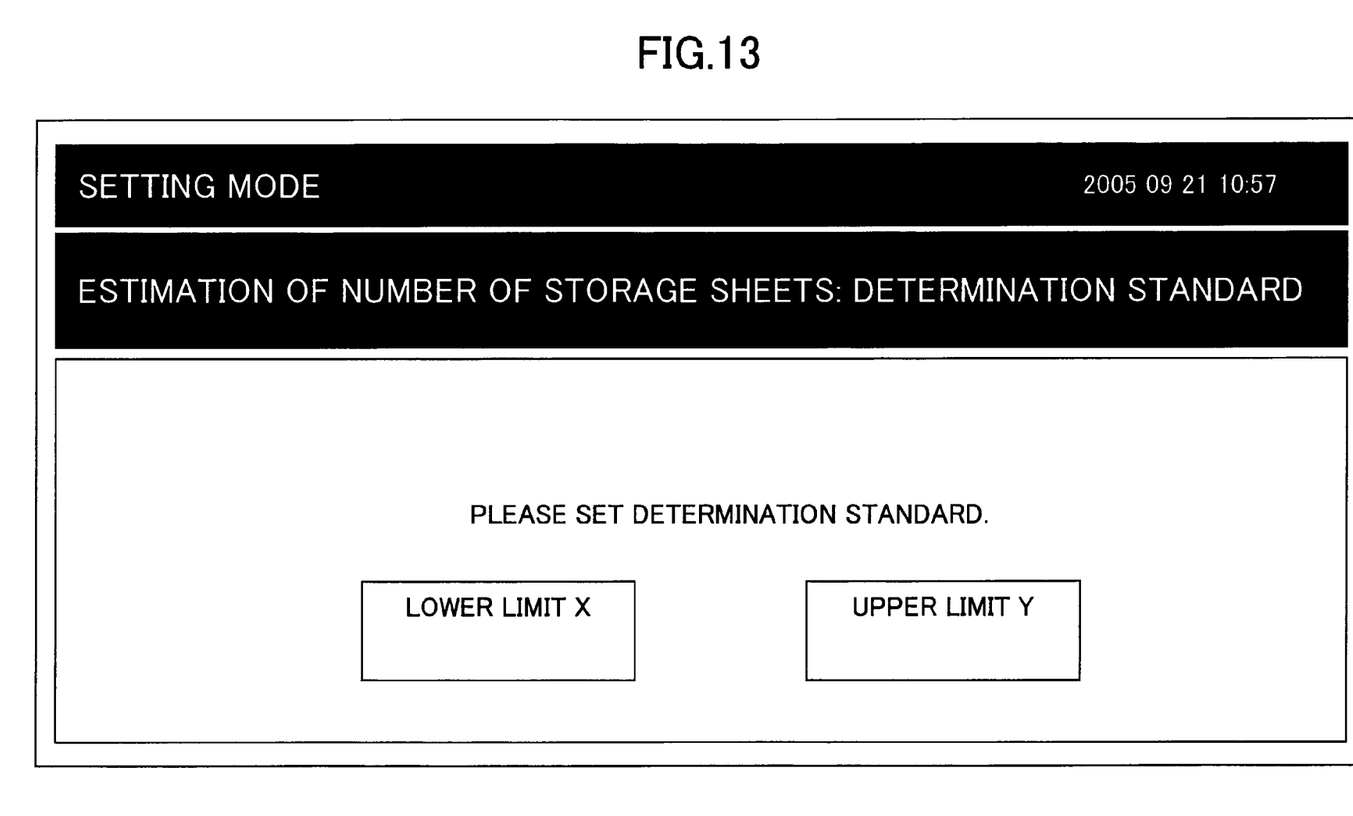
FIG. 13 is a view showing an example of a screen for setting a standard value x and a standard value y.

FIG. 11 through FIG. 13 are view showing examples of the screen displayed on the operations part 25 for setting various setting values of FIG. 5, FIG. 9, and FIG. 10.

FIG. 11 is a view showing an example of a screen for setting the reading width from the head end of the document. The reading width from the head end of the document can be input by operating the operations keys including the ten key 32 and can be stored in the NVRAM 24 by the CPU 20.

FIG. 12 is a view showing an example of a screen for setting a reading starting position and a reading ending position of each of the reading areas A and B. The reading starting position and the reading ending position of each of the reading areas A and B can be input by operating the operations keys including the ten key 32 and can be stored in the NVRAM 24 by the CPU 20.

FIG. 13 is a view showing an example of a screen for setting the standard value x (the lower limit value of the amount of the image data per unit area) and the standard value y (the upper limit value of the amount of the image data per unit area). Each of the standard values X and Y can be input by operating the operations keys including the ten key 32 and can be stored in the NVRAM 24 by the CPU 20.

The CPU 20 can selectively implement the controls of the first example through the third example. In this case, each of the controls may select by the operations keys of the operations part 25.

Thus, according to the first example through the third example, only for the area of a part of the document image is read, the image data size of one surface of the document is calculated based on the size of the image data of the area, the number of pages of the image data of the document that can be stored in the memory (RAM 22) are calculated based on the image data size and the output conditions set in advance, and the number of the pages are displayed on the operations part 25 and reported to the user.

Here, by setting the reading range for calculating the image data size smaller than the size in the reading direction of the document, a moving time of a moving body having a reflection mirror or an exposed lamp in the scanner engine 11 becomes shorter. Therefore, estimating time of the number of pages of the image data of the document that can be stored in the memory becomes short.

Accordingly, by displaying the number of pages of the image data of the document that can be stored in the memory on the operations part 25 and reporting it to the user, the user can know the number of pages under a desirable output condition before copying is started.

In other words, since whether copying under the desirable conditions is possible can be determined before copying starts, it is possible to prevent sending overcapacity of the image data to the memory after copying starts.

In addition, since the user receiving the report of the number of pages can know that even copying a part of each of the pages of the document is possible under the desirable conditions, it is possible to start copying the part under the desirable conditions.

Thus, according to the embodiment of the present invention, it is possible to provide an image processing apparatus, including: an image reading part configured to read an image of a document; and an image storage part configured to store image data read by the image reading part; wherein the image reading part includes a part configured to read a range of a part of the image of the document; the image processing apparatus further includes: a first calculating part configured to calculate image data of a one surface of the document based on a size of the image data of the range read by the image reading part; and a second calculating part configured to calculate the number of pages of image data of the document which can be stored by the image storage part based on the result of calculation by the first calculating part.

In the image processing apparatus, the image reading part may read the range as a range from the head end of the document in the reading direction.

The image processing apparatus may further include a range setting part configured to set the range.

In the image processing apparatus, the image reading part may read the range as a range defined by a reading starting position and a reading ending position from the head end of the document in the reading direction.

The image processing apparatus may further include a range setting part configured to set the range.

In the image processing apparatus, the range setting part can set a plurality of the ranges; the image reading part may read the plural ranges in a case where the plural ranges are set by the range setting part; and the first calculating part may calculate, in a case where image data of the plural ranges are read by the image reading part, an image data size of the one surface of the document, based on sizes of the image data of the plural ranges.

In the image processing apparatus, the image reading part may read one of a plurality of the ranges which ranges are set by the range setting part; and the image reading part may read a further different range in a case where a size of image data of the read range is not within a designated data size.

The image processing apparatus may further include a data size setting part configured to set the designated data size.

According to the image processing apparatuses of the embodiments of the present invention, the image processing apparatus can read only an area of a part of a document image so that the number of pages of document image data that can be stored in the image storage part can be estimated (calculated).

Therefore, it is possible to report the number of the pages to a user before output of the image data is started. Accordingly, according to the embodiments of the present invention, it is possible to provide a useful image processing apparatus.

The present invention is not limited to these embodiments, but variations and modifications may be made without departing from the scope of the present invention.

For example, the MFP (digital multifunction product) is discussed above as the example of the image processing apparatus of the present invention. However, the present invention is not limited to this. For example, the present invention can be applied to other image forming apparatuses such as a digital multifunction product, printer, and a facsimile and an image processing apparatus such as a scanner which can be installed in or connected to these image forming apparatuses.

This patent application is based on Japanese Priority Patent Application No. 2006-184498 filed on Jul. 4, 2006, the entire contents of which are hereby incorporated by reference.

What is claimed is:

1. An image processing apparatus, comprising: an image reading part configured to read an image of a document; and an image storage part configured to store image data read by the image reading part; wherein the image reading part includes a part configured to read a range of a part of the image of the document; the image processing apparatus further includes: a first calculating part configured to calculate image data of a one surface of the document based on a size of the image data of the range read by the image reading part; a second calculating part configured to calculate the number of pages of image data of the document which can be stored by the image storage part based on the result of calculation by the first calculating part, and a range setting part configured to set the range, wherein the image reading part reads the range as a range defined by a reading starting position and a reading ending position from the head end of the document in the reading direction, wherein the range setting part can set a plurality of the ranges, wherein the image reading part reads the plural ranges in a case where the plural ranges are set by the range setting part, wherein the first calculating part calculates, in a case where image data of the plural ranges are read by the image reading part, an image data size of the one surface of the document, based on sizes of the image data of the plural ranges wherein the first calculating part is configured to calculate image data of the one surface of the document based on the size of the image data of a first range read by the image reading part and the size of the image data of a second range read by the image data, the first range being different than the second range, and wherein the number of pages of image data which can be stored by the image storage part L is based on a memory free capacity of the image storage part N, the size of the image data of the first range m, the size of the image data of the second range n, an area of the document, and a sum of a reading area, such that $L=N/((m+n)*$ document area/sum of the reading area).

2. The image processing apparatus as claimed in claim 1, wherein the image reading part reads the range as a range from the head end of the document in the reading direction.

3. The image processing apparatus as claimed in claim 2, further comprising: a range setting part configured to set the range.

4. The image processing apparatus as claimed in claim 1, wherein the image reading part reads one of a plurality of the ranges which ranges are set by the range setting part; and the image reading part reads a further different range in a case where a size of image data of the read range is not within a designated data size.

5. The image processing apparatus as claimed in claim 4, further comprising: a data size setting part configured to set the designated data size.

* * * * *